United States Patent [19]

Tieleman

[11] Patent Number: 4,951,353

[45] Date of Patent: Aug. 28, 1990

[54] POULTRY THIGH DISJOINTING METHOD AND APPARATUS

[75] Inventor: Rudolf J. Tieleman, Doesburg, Netherlands

[73] Assignee: Linco Holland Engineering B.V., Doesburg, Netherlands

[21] Appl. No.: 452,103

[22] Filed: Dec. 18, 1989

[51] Int. Cl.⁵ .............................................. A22C 21/00
[52] U.S. Cl. ............................................ 17/11; 17/52
[58] Field of Search ...................................... 17/11, 52

[56] References Cited

U.S. PATENT DOCUMENTS

| | | | |
|---|---|---|---|
| 4,131,973 | 1/1979 | Uerbakel | 17/52 |
| 4,593,435 | 6/1986 | Martin et al. | 17/52 |
| 4,616,380 | 10/1986 | Tieleman | 17/11 |
| 4,709,448 | 12/1987 | McGuire et al. | 17/11 |
| 4,776,062 | 10/1988 | Tieleman | 17/11 |

Primary Examiner—Willis Little
Attorney, Agent, or Firm—Beveridge, De Grandi & Weilacher

[57] ABSTRACT

Poultry thighs are disjointed by the relative movement of members which contact the breast side of the thigh joint area and members which contact the back side of the thigh joint area. The members are arranged in pairs so that two members on the back side of the bird are moved simultaneously toward a corresponding pair of members on the breast side of the bird. One pair of members is fixed to a rotating support, and the other pair of members is mounted on a cam-actuated arm which is pivotally mounted on the rotating support. A plurality of corresponding pairs of members is provided around the circumference of the apparatus.

21 Claims, 3 Drawing Sheets

POULTRY THIGH DISJOINTING METHOD AND APPARATUS

BACKGROUND OF THE INVENTION

This invention relates to a method and apparatus for disjointing the thighs of poultry carcasses.

It is a customary practice in some areas of the food service industry to disjoint the thigh joints of chickens in order to achieve more uniform cooking. Customarily this has been done manually by workers who grasp the thighs of a bird with two hands and perform successive twisting movements in order to pop the thigh joints consecutively. In recent months, others have developed a machine in which birds initially go through a first mechanism where one thigh joint is disjointed, and then proceed through another mechanism where the other thigh joint is disjointed.

The present invention provides a machine and apparatus which effectively disjoints the thigh joints of poultry carcasses at a reasonable speed, reduces manpower expenses, provides reliable operation, and minimizes maintenance and repair costs.

SUMMARY OF THE INVENTION

This invention relates to poultry processing machines for automatically disjointing the thigh joints of birds in a poultry processing facility. In such machines, means are provided for supporting the birds and conveying them in a machine direction so that a first bird precedes a second bird as they move through the apparatus. First members are provided for contacting and positioning the breasts of the birds, and second members are provided for contacting the thighs on the back sides of the birds. Actuating means provide relative movement between the members to disjoint the thigh joints of the birds.

According to a first feature of the invention, apparatus as described in the preceding paragraph is provided with two of the first members which are fixed relative to each other and are arranged to contact simultaneously the breast of the first bird and the breast of the second bird; two of the second members are fixed relative to each other and are arranged to contact simultaneously the thigh of the trailing leg of the first bird and the thigh of the leading leg of the second bird; and, the actuating means provides relative movement so that the two first members and the two second members move toward each other simultaneously to disjoint the thigh joint of the trailing leg of the first bird and the thigh joint of the leading leg of the second bird.

Another aspect of the invention involves the improvement wherein a thigh disjointing machine has a rotating support; one set of the members is fixed to the rotating support; and, another set of the members is mounted on arms which are movably connected to the rotating support.

Preferably, a driven conveyor chain moves the birds through the apparatus, and means are provided for transmitting driving forces from the conveyor chain to the rotating member. The thigh engaging members are spaced farther apart than the breast engaging members, the two simultaneously acting breast engaging members converge toward each other in a downward direction, and the two simultaneously acting thigh contacting members also converge toward each other in a downward direction.

The invention also involves a method for automatically disjointing the thigh joints of birds. According to this method, a first pair of members are moved into contact (i) with a first bird in a region where its breast is connected to the thigh of its trailing leg, and (ii) with a second bird in a region where its breast is connected to the thigh of its leading leg. A pair of second members are moved into contact (i) with the first bird in a region where its back is connected to the thigh of its trailing leg and (ii) with the second bird in a region where its back is connected to the thigh of its leading leg. Relative movement is provided to force the pair of first members and the pair of second members toward each other in order simultaneously to disjoint the thigh joint of the trailing leg of the first bird and the thigh joint of the leading leg of the second bird.

DETAILED DESCRIPTION

Figure 1:
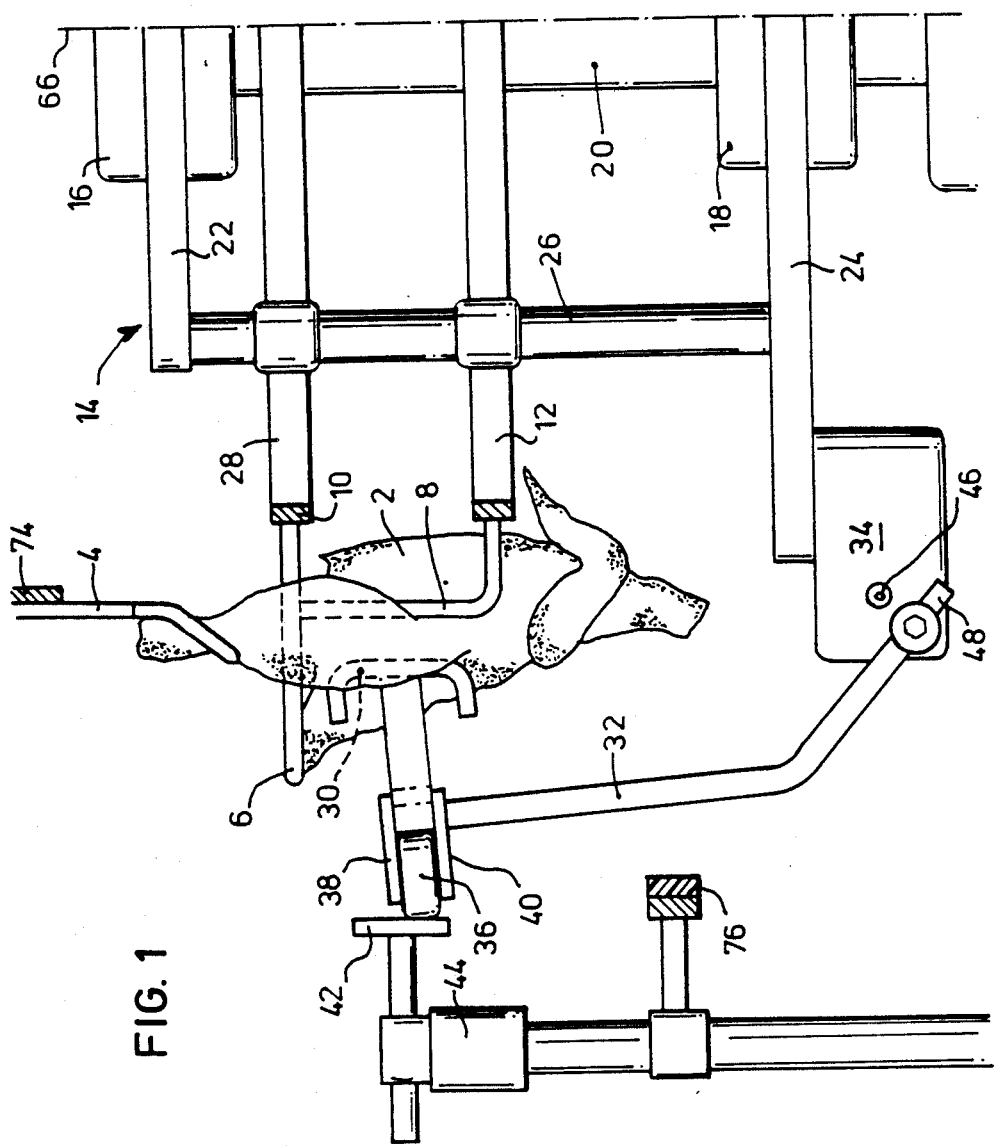
FIG. 1 is an elevational view of a machine, looking at a side of a bird which is in the process of being disjointed according to the invention.

As shown in FIG. 1, the bird 2 is hanging from a shackle 4 which has conventional leg hooks. The position of the bird is stabilized by a conventional leg loop 6 and by a generally vertical rod 8 which contacts the bird where its breast is connected to its thigh. The leg loop 6 and rod 8 are welded to annular rings 10 and 12 of a rotating barrel assembly 14.

The barrel assembly 14 is rotationally supported by bearing assemblies 16 and 18 which are mounted on a fixed main shaft 20. The barrel assembly includes a circular upper plate 22 and a circular lower plate 24 which are connected together by a plurality of vertical rods 26. Horizontal rods 28 extend radially from the vertical rods to support the rings 10 and 12.

The back of the bird in FIG. 1 faces radially outwardly. On the back side of the bird, a disjointing rod member 30 contacts the bird where its thigh is connected to the back. The disjointing rod 30 is mounted on the upper end of an arm 32 which has its lower end pivotally mounted on a block 34 on the lower plate 24. A roller 36 is rotationally mounted on the upper end of the arm by a pair of plates 38 and 40.

In the position shown in FIG. 1, the roller 36 is riding on a linear cam 42 which is adjustably mounted on a support member 44.

The block 34 is provided with a stop 46 located in the path of a tail extension 48 of the arm 32. This stop 46 limits the extent of counterclockwise rotation of the arm 32 after the roller 36 travels past the cam 42.

Figure 2:
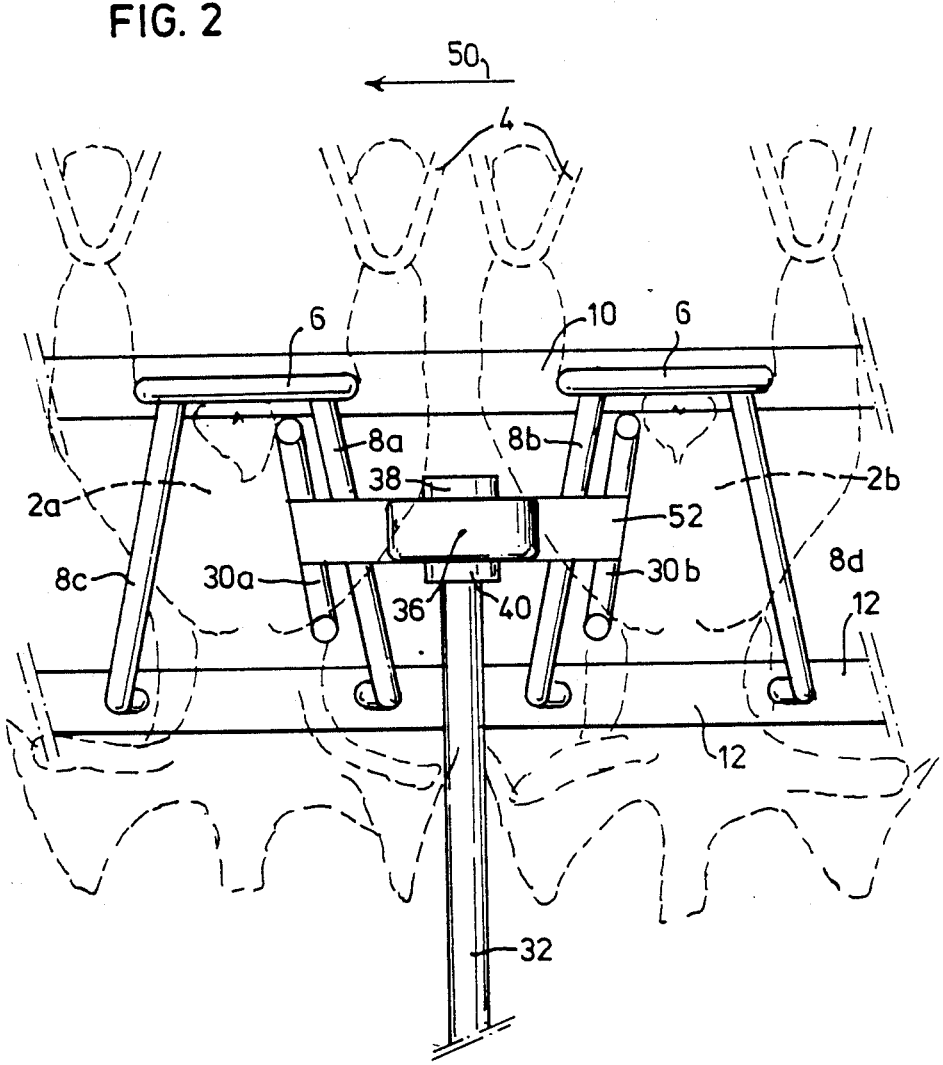
FIG. 2 is a view similar to FIG. 1, with a broken line illustration of two birds having their thigh joints disjointed simultaneously

In FIG. 2, the birds are traveling in a direction represented by the arrow 50 so that the first bird 2a precedes the second bird 2b during their movement through the apparatus.

As shown in FIG. 2, the breast positioning members 8a and 8b and the thigh disjointing members 30a and 30b are arranged in pairs. More specifically, the positioning rods 8a and 8b are arranged to contact simultaneously the breast at the trailing leg of the first bird 2a and the breast at the leading leg of the second bird 2b. The disjointing rods 30a and 30b are mounted on a U-shaped bracket 52 (FIG. 3) on the upper end of the arm 32 so that they are fixed relative to each other and arranged to contact simultaneously the thigh of the trailing leg of the first bird 2a and the thigh of the leading leg of the second bird 2b. Thus, a single movement of the arm 32 causes two disjointing rods to cooperate with two positioning rods in a manner so that the thigh joints of two adjacent birds 2a and 2b are disjointed simultaneously.

The positioning rods 8c and 8d shown in FIG. 2 operate in cooperation with other disjointing rods which have been omitted from FIG. 2 for purposes of clarity.

The cooperating pairs of positioning rods 8a and 8b converge toward each other in a downward direction; and, the cooperating pair of disjointing rods 30a and 30b also converge toward each other in a downward direction. The disjointing rods 30a and 30b are spaced farther apart than the positioning rods 8a and 8b.

Figure 3:
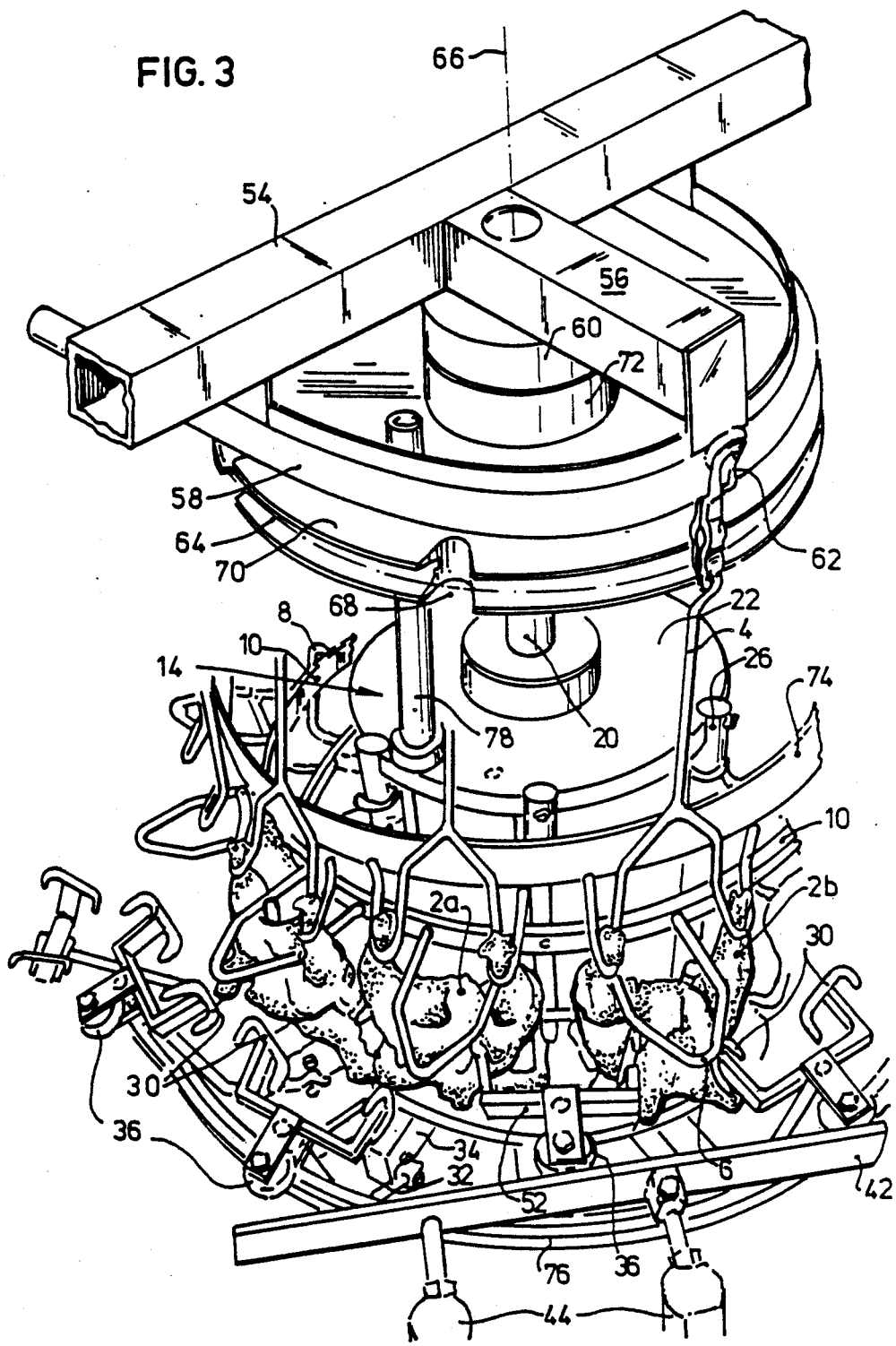
FIG. 3 is a perspective view showing the main components of a machine constructed according to the invention.

A more complete machine is shown in FIG. 3. It includes a frame with beams 54,56 which support a tubular bird-carrying rail 58 and a stationary shaft holder 60. Trolleys 62 connected by a drive chain represented by dot-dash line 64 travel along the rail 58 in an arcuate path, the rotational center of which coincides with the machine's center of rotation 66. Each trolley 62 has a depending portion received in a notch 68 in the circumference of a nylon drive wheel 70 which is rotationally supported on shaft 20 by a bearing assembly 72. The drive wheel 70 has a circumferential groove which receives the drive chain 64 connected to the trolleys. Each trolley 62 carries a conventional cutup shackle 4 with open leg-receiving hooks.

Stationary members shown in FIG. 3 include the beams 54,56, the shaft 20, a shackle guide bar 74, the flat cam 42, the cam supports 44, and an arm guide bar 76. The purpose of the guide bar 76 is to prelift each arm 32 to a position where its cam-following roller 36 will land properly on the cam 42. After the roller travels beyond the cam 42, the guide bar 76 is shaped to ease the arm 32 downwardly to minimize or eliminate impact when the tail extension of the arm contacts the stop 46 shown in FIG. 1.

The drive wheel 70 is rotated by the movement of the conveyer chain 64, and this rotational movement is transmitted by a vertical eccentric rod 78 to the barrel assembly 14, thus causing the barrel assembly and the components attached to it to rotate at substantially the same velocity as the bird-carrying shackles, trolleys and chain.

When the apparatus is in operation, the birds are hung in the shackles 4 at a position upstream of the disjointing machine. As they approach the disjointing machine, the birds move radially inwardly so their legs straddle the leg loops 6 and their breasts come into contact with the positioning rods 8, 8a, 8b, etc. As each bird moves forward along its arcuate path of travel, its respective disjointing rods 30, 30a, 30b are moved radially inwardly, first against its leading leg and then against its trailing leg, in order to perform the disjointing action in a consecutive manner. In FIG. 3, the bird 2a is having its trailing joint disjointed. At this time, its torso makes a slight counterclockwise movement, and its trailing leg turns in a clockwise direction. Conversely and simultaneously, the leading leg of the second bird 2b rotates counterclockwise while its torso rotates in a clockwise direction. By permitting the torsos to rotate rather than by holding them rigidly, fracturing of the ribs is avoided.

After a disjointing arm 32 has performed its function, it advances and it travels radially outwardly until it falls into contact with the guide bar 76 which gradually lowers it until the tail extension of the arm 32 contacts the stop 46 (FIG. 1).

While only one embodiment of the invention has been shown, persons familiar with the art will realize that the invention may take many other forms. The disjointing bars may be mounted on mechanisms other than swinging arms; the birds may be reversed so their breasts face outwardly; a single disjointing rod or other member can be mounted at the upper end of each arm; various types of means and directions of movement can be utilized; and, the positioning rods rather than the disjointing rods may be moved to perform the disjointing action. In view of the many ways in which the invention may be practiced, it is emphasized that the invention is not limited to the disclosed embodiment but is embracing of many other types of apparatuses and methods which fall within the spirit of the following claims.

I claim:

1. In an apparatus for automatically disjointing the thigh joints of birds in a poultry processing facility, each of said birds having a breast, a back side, and two thighs; said apparatus including means for supporting the birds and conveying them in a machine direction so that a first bird precedes a second bird as they move through the apparatus, and each bird has a leading leg and a trailing leg as it moves through the apparatus, said apparatus including a plurality of first members for retaining the breast sides of the birds, a plurality of second members for contacting the thighs of the birds on the back sides of the birds, actuating means for providing relative movement which moves the first members and the second members toward each other to disjoint the thigh joints of the birds, the improvement wherein a pair of said first members are fixed relative to each other and are arranged to contact simultaneously the breast of the first bird and the breast of the second bird, a pair of said second members which are fixed relative to each other and are arranged to contact simultaneously the thigh of the trailing leg of the first bird and the thigh of the leading leg of the second bird, said actuating means being operable to provide relative movement which simultaneously moves said pair of first members and said pair of second members toward each other, said apparatus locating the first and second birds at positions where said relative movement simultaneously disjoints the thigh joint of the trailing leg of the first bird and the thigh joint of the leading leg of the second bird.

2. Apparatus according to claim 1 wherein the first pair of members are spaced farther apart than the second pair of members.

3. Apparatus according to claim 2 wherein the first pair of members converge toward each other in a downward direction, and the second pair of members converge toward each other in a downward direction.

4. Apparatus according to claim 3 wherein the first pair of members are spaced farther apart than the second pair of members.

5. Apparatus according to claim 1 having a rotating support, on said pair of members being fixed to said rotating support, and the other said pair of members being mounted on an arm which is pivotally connected to said rotating support.

6. Apparatus according to claim 5 having a driven conveyor chain for moving the birds through the apparatus, and means for transmitting driving forces from the driven conveyor chain to the rotary member.

7. Apparatus according to claim 1 wherein the second members are positioned to contact the birds where their backs are connected to their thighs.

8. Apparatus according to claim 1 wherein the birds are supported for movement in an arcuate path having a center of rotation, and the relative movement between the pair of first members and the pair of second members is in a radial direction relative to said center of rotation.

9. Apparatus according to claim 8 having an arm which supports one said pair of members, said arm being pivotally mounted to permit simultaneous movement of said pair of members in a radial direction relative to said center of rotation.

10. Apparatus according to claim 9 having a plurality of said arms which each have a pair of members mounted thereon, a rotary member to which said arms are pivotally mounted, said rotary member being rotatable about said center of rotation, and stationary cam means for engaging and moving the support arms to force the pair of members thereon in a radial direction relative to said center of rotation.

11. Apparatus according to claim 10 wherein the means for supporting and conveying the birds includes a driven conveyor chain for moving the birds through the apparatus, and means for transmitting driving forces from the driven conveyor chain to the rotating member.

12. In an apparatus for automatically disjointing the thigh joints of birds in a poultry processing facility, each of said birds having a breast, a back side, and two thighs; said apparatus including means for supporting the birds and conveying them in a machine direction so that a first bird precedes a second bird as they move through the apparatus, and each bird has a leading leg and a trailing leg as it moves through the apparatus, said apparatus including a first set of members for retaining the breast sides of the birds, a second set of members for contacting the thighs, actuating means for providing relative movement between the members of the first and second sets to disjoint the thigh joints of the birds, the improvement wherein the apparatus has a rotating support, said members of one said set being fixed to said rotating support, and said members of the other said set being mounted on arms which are movably connected to said rotating support.

13. Apparatus according to claim 12 wherein the members of the second set are positioned to contact the birds where their backs ar connected to their thighs.

14. Apparatus according to claim 12 wherein the members of the other set are arranged in pairs which are rigidly connected to each other and are movable relative to other said pairs of the other set.

15. Apparatus according to claim 12 having a driven conveyor chain for moving the birds through the apparatus, and means for transmitting driving forces from the driven conveyor chain to the rotating support.

16. Apparatus according to claim 12 wherein the members of the first set are positioned to contact the birds where their breasts are connected to their thighs.

17. Apparatus according to claim 12 wherein the birds are supported for movement in an arcuate path having a center of rotation, and the relative movements between the members of said first set and the members of said second set are in radial directions relative to said center of rotation.

18. Apparatus according to claim 17 wherein said arms are pivotally mounted to permit movement of said members of the other said set in a radial direction relative to said center of rotation.

19. Apparatus according to claim 18 wherein the actuating means includes a stationary cam for engaging and moving the arms to force the members thereon in a radial direction relative to said center of rotation.

20. Apparatus according to claim 12 wherein the means for supporting and conveying the birds includes a driven conveyor chain for moving the birds through the apparatus, and means for transmitting driving forces from the driven conveyor chain to the rotating member.

21. A method of automatically disjointing the thigh joints of birds in a poultry processing facility, each of said birds having a breast side, a back side, and two thighs; said method including the steps of:
   supporting the birds and conveying them in a machine direction so that a first bird precedes a second bird as they move through the apparatus, each bird having a leading leg and a trailing leg as it moves through the apparatus;
   moving a pair of first members into contact (i) with the first bird in a region where the breast is connected to the thigh of its trailing leg, and (ii) with the second bird in a region where its breast is connected to the thigh of its leading leg,
   moving a pair of second members into contact (i) with the first bird in a region where its back is connected to the thigh of its trailing leg and (ii) with the second bird in a region where its back is connected to the thigh of its leading leg,
   providing relative movement which forces said pair of first members and said pair of second members toward each other, said first and second birds being at positions where said relative movement simultaneously disjoints the thigh joint of the trailing leg of the first bird and the thigh joint of the leading leg of the second bird.

* * * * *